United States Patent
Gubo

(10) Patent No.: US 7,154,629 B2
(45) Date of Patent: Dec. 26, 2006

(54) DOCUMENT ARCHIVING METHOD

(76) Inventor: Adalbert Gubo, Frauenlobstrasse 55, D-55118 Mainz (DE)

( * ) Notice: Subject to any disclaimer, the term of this patent is extended or adjusted under 35 U.S.C. 154(b) by 256 days.

(21) Appl. No.: 10/261,921

(22) Filed: Oct. 1, 2002

(65) Prior Publication Data

US 2003/0030845 A1  Feb. 13, 2003

Related U.S. Application Data

(63) Continuation-in-part of application No. 08/981,995, filed on Jun. 19, 1998, now abandoned.

(51) Int. Cl.
*G06F 15/00* (2006.01)
(52) U.S. Cl. .................... 358/1.17; 358/1.16
(58) Field of Classification Search ............ 358/1.17, 358/1.16, 401, 444
See application file for complete search history.

(56) References Cited

U.S. PATENT DOCUMENTS

| | | | |
|---|---|---|---|
| 5,075,875 A | | 12/1991 | Love et al. |
| 5,131,077 A | * | 7/1992 | Indei ......................... 358/1.14 |
| 5,241,466 A | | 8/1993 | Perry et al. |
| 5,428,747 A | * | 6/1995 | Kitamoto ................... 364/226 |
| 5,619,649 A | * | 4/1997 | Kovnat et al. ............... 358/1.1 |
| 5,754,308 A | * | 5/1998 | Lopresti et al. ............. 358/403 |
| 5,864,652 A | * | 1/1999 | Murahashi ................. 358/1.16 |
| 6,016,386 A | * | 1/2000 | Nosaki et al. ............. 358/1.15 |

FOREIGN PATENT DOCUMENTS

| | | |
|---|---|---|
| EP | 0 273 435 | 7/1988 |
| JP | 2-246469 | 10/1990 |

* cited by examiner

*Primary Examiner*—Gabriel I. Garcia
(74) *Attorney, Agent, or Firm*—Collard & Roe, P.C.

(57) ABSTRACT

A method of archiving documents by duplicating data by means of an acquisition and reproduction circuit connected to a personal computer, the circuit responding to a current document image output signal from a running printer. The information is stored in the computer's memory as a binary identical image of the document to be printed. The image is then archived for permanent storage.

3 Claims, 2 Drawing Sheets

DOCUMENT ARCHIVING METHOD

CROSS-REFERENCE TO RELATED APPLICATIONS

This application is a continuation-in-part of U.S. patent application Ser. No. 08/981,995 filed on Jun. 19, 1998, now abandoned which claims priority under 35 U.S.C. §365 of PCT/DE96/01172 filed on Jul. 1, 1996. This application also claims priority of German No. 195 24 398.6 filed on Jul. 4, 1995.

BACKGROUND OF THE INVENTION

1. Field of the Invention

This invention relates to a method for archiving documents on a personal computer by providing an acquisition and reproduction circuit for activating the memory of a personal computer to store a binary image identical of the last printed document output signal from an attached printer.

2. The Prior Art

It is known that a copy of a document or of a drawing is produced by making a photostatic copy. The methods used in this connection are mainly:

(a) Filming, e.g. microfilm; or (b) Screened electronic copy by a copier or scanner, such as defined by JP 2-246469 (A).

Both methods are based on acquisition of the original by mechanically passing it through an optical lens system. The limitations resulting from this method are, on the one hand, lack of speed of such systems, and possible falsification due to soiling or damage of the lens system, on the other hand.

Scanning images can be made by scanning the data carrier, i.e., the printed page. In this case, the page has to be printed before scanning can occur. Optical scanners can be used to monitor the printed image after the printing process and prepare the result in a digital format, i.e., for archiving purposes. The electronic copy produced by a scanner is stored in a memory so as to be available for repeated printouts.

Scanning images can also be done by scanning the printers bitmap memory. In this case, the page is not printed before scanning. In this case, it is necessary to have additional information on how and where the contents for the printer's bitmap memory has to be organized to represent the human readable text image. This can be done by reading an interpreting the commands in the printer's specific printer command language, etc. and then providing the printers' bitmap memory with additional address lines to get the raster information out of the printer's bitmap memory for copying purposes. If this is done correctly, the result should be the image like the printer's printing engine would have printed.

Raster based printers put images on the paper by transferring raster data to a printing drum which is rotating. If one is monitoring only the raster data transferred to the printer's drum without any additional information, there is not exact possibility to make a decision where to place the raster data to compose an image which is the same as the image on the printer's raster drum, and one turn around later, on the paper.

SUMMARY OF THE INVENTION

As opposed traditional scanning, the present invention is based on the problem of archiving a document without renewed acquisition. The present invention obtains the necessary additional information described above by monitoring the printer's turnaround of its printing drum and computing the additional information.

The invention eliminates the drawbacks of the prior art and makes it possible to raise the otherwise low speed for acquiring the original in one processing step to the high speed of the printer, and to avoid falsifications due to dirty optics and/or manual interventions, for example in the form of mix-ups.

The advantages gained with the invention include in particular that for archiving and verification, an identical copy is always produced in the matrix format of the given document without subjecting the printed original to a later treatment, for example by a scanner or through microfilming. This identical copy can then be used again for producing a printed image that is identical with the original.

The speed of the printer is not impaired either in the acquisition or the printing process.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
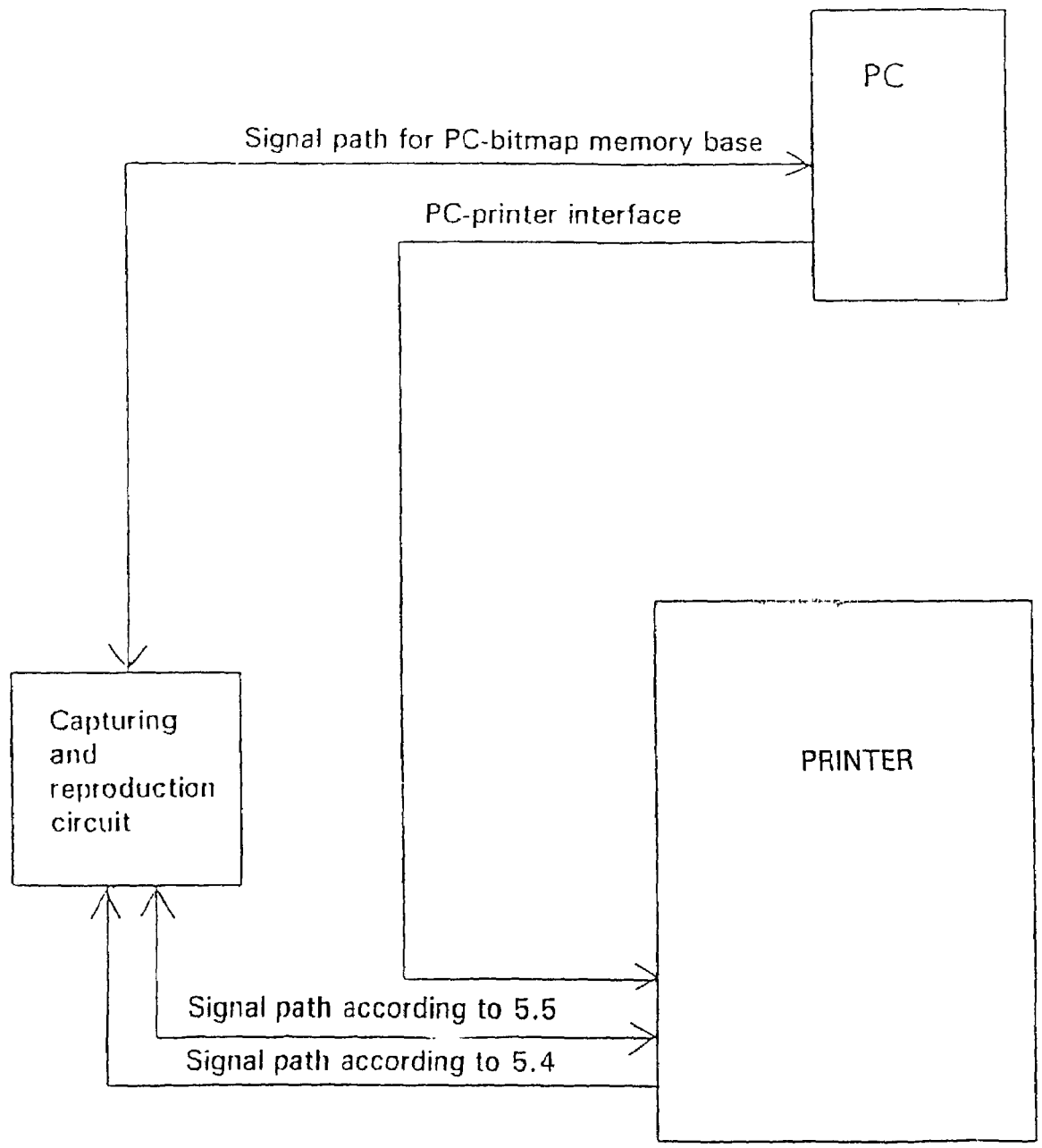
FIG. 1 shows a schematic of the computer and printer connection according to the invention.

FIG. 1 shows an exemplified embodiment of a Delphax® ion jet printer with a speed of up to 150 DIN A4-pages per minute. The connection designated as "signal according to 5.4" transports the screened bitmap data from the printer to the acquisition and reproduction circuit. The acquisition and reproduction circuit responds to the current image output signal from the running printer and activates the memory of the personal computer.

The method of archiving comprises activating the memory of a personal computer by means of the acquisition and reproduction circuit responding to a current document image output signal from the running printer. Then, storing a binary identical image of the document to be printed in the memory. This image is then archived for permanent storage.

Activation of the memory of the personal computer occurs by duplicating the data in the acquisition and reproduction circuit during printing, providing the data with the format information for the current print, transmitting the data to a circuit in the PC and storing it. This takes place via the connection designated as "signal path for PC-bitmap memory". The archived binary image is visible on the screen of the personal computer.

Via the connection designated as "signal path according to 5.5", the screened bitmap data are returned again for printing to the printer.

When the screened bitmap data stored in the PC are to be printed again, this takes place by the reversed process.

Via the connection designated as "signal path for PC-bitmap memory", the screened bitmap data are received in the acquisition and reproduction circuit and from there passed to the printer via the connection designated as "signal path according to 5.5".

Figure 2:
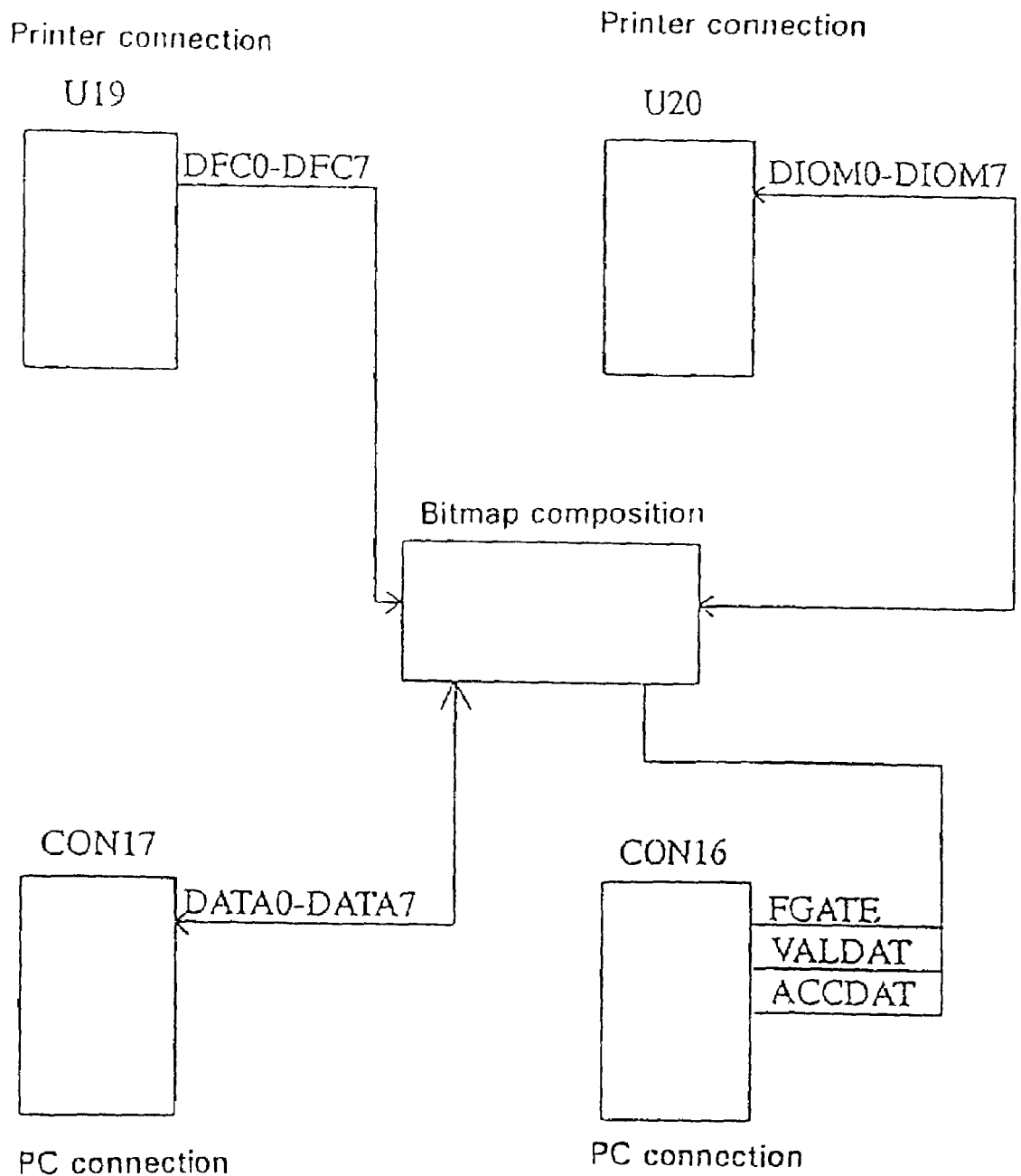
FIG. 2 shows a schematic of the acquisition and reproduction circuit according to the invention.

Signal Description Op Acquisition and Reproduction Circuit According to FIG. 2:

The Bitmap composition unit as shown in FIG. 2 is able to obtain the additional information necessary for the process according to the invention. U20 provides the additional information to compute the exact position of the Bitmap data given by U19. In this case, no additional address lines for the printer's bitmap memory is needed, nor is it necessary to interpret the printer's specific command language on how and where to handle the bitmap data, i.e. where on the paper the image is to be placed.

All of this is done by merging the bitmap data provided by U19 with the additional information given by U20 via the logic connections of the data signals from 5.2 and 5.4 shown in FIG. 1.

Pixel data on where to print is taken from the printer's bitmap memory by monitoring the appropriate data path. The position where to store the bitmap memory is taken from the printer's turnaround of its printing drum.

Thus, there are two sources for the Bitmap data to place on the paper: the pixel data, coming from the electronic pixel memory, and the additional data coming frm the printer's drum turnaround and paper detection signals. Therefore, the complete computation must be done in real-time.

The signals applied to the following connections are relevant to the acquisition and reproduction of the printed image:

| | | | |
|---|---|---|---|
| 5.1 Signal Name FGATE | Pin: 4 | Plug connector CON16 | Application purpose: Main cycle for controlling the overall sequence. |
| 5.2 Signal name: DATA0-DATA7 | Pin: all straight pins | Plug connector CON16 | Application purpose: Bidirectional databus with color information for the matrix dots. |
| 5.3 Signal name: VALDAT | Pin: 6 | Plug connector CON16 | Application purpose: Handshake signal for data traffic out of the printer. |
| ACCDAT | 8 | CON16 | Handshake signal for data traffic into the printer. |
| 5.4 Signal name: DFCO-SCF7 | Pin: 1–8 | Plug connector U19 | Application purpose: Unidirectional data signal coming from the matrix image processor with color information for the matrix dots. |

-continued

| | | | |
|---|---|---|---|
| 5.5 Signal name DIOM0-DIOM7 | Pin: 1–8 | Plug connector U20 | Application purpose: Logic operation of data signals ex 5.2 and 5.4. |

The PC is connected to the acquisition and reproduction circuit via connections CON16 and CQN17. This connection is designated as "signal path for PC-bitmap memory".

The printer is connected to the acquisition and reproduction circuit via connections U19 and U20.

Connection U19 to the printer is designated as "signal path according to 5.4".

Connection U20 to the printer is designated as "signal path according to 5.5".

The advantages of the present invention are as follows: no extra address lines to the printer's memory, therefore one development can easily be adopted to a wide variety of different printer models. By coupling signals from the electronic memory as well as the printer itself, the proof of real paper print-out is done. The resulting image is always guaranteed to be the exact electronic copy of the printed image, inclusive of all distortions which can be provided by different positions of paper sensors in the printer paper path, for example.

There are several security advantages provided by the system, including airline ticket printing systems with additional hash information brought up on the paper as well as on the electronic copy which is made with the present invention as a basis. In this case, on is able to make an absolutely secure decision as to whether a paper printout from the present invention corresponds to an eletronic copy of a ticket or not.

Accordingly, while only a few embodiments of the present invention have been shown and described, it is obvious that many changes and modifications may be made thereunto without departing from the spirit and scope of the invention.

What is claimed is:

1. A method of archiving documents comprising:
   in an bitmap composition unit merging
      the bitmap data taken from a printer's bitmap memory with
      additional information taken from the said printer's turnaround of its printing drum and paper detection signals,
   transmitting the said merged data to a circuit in a personal computer having a memory, activating the memory of the personal computer by means of an acquisition and reproduction circuit connected to the personal computer and to a printer, in response to a current document image output signal from the running printer during printing, wherein the said activating step comprises duplicating the data in the acquisition and reproduction circuit during printing, providing the data with the format information for the current print, transmitting these data to a circuit in the said personal computer, and storing in the said memory of said personal computer the said merged data which form a binary identical image of the printed document; and archiving said binary identical image for permanent storage.

2. The method according to claim 1, wherein for copying purposes, said printer creates a renewed printout signal through the same acquisition and reproduction circuit.

3. The method according to claim 1, wherein said archived binary identical image is visible by displaying said image on a screen of the personal computer.

* * * * *

UNITED STATES PATENT AND TRADEMARK OFFICE
CERTIFICATE OF CORRECTION

PATENT NO. : 7,154,629 B2  Page 1 of 1
APPLICATION NO. : 10/261921
DATED : December 26, 2006
INVENTOR(S) : Gubo It is certified that error appears in the above-identified patent and that said Letters Patent is hereby corrected as shown below:

In particular, on the Title page, column 1, item (30), the Foreign Application Priority data correctly should read:
-- Jul. 4, 1995   (DE)...............195 24 398.6
   Jul. 1, 1996   (DE)..............PCT/DE96/01172 --.

Signed and Sealed this

Twenty-sixth Day of February, 2008

JON W. DUDAS
*Director of the United States Patent and Trademark Office*